(12) United States Patent
Jeng et al.

(10) Patent No.: US 6,294,593 B1
(45) Date of Patent: Sep. 25, 2001

(54) METHOD AND CROSSLINKABLE POLYMERS FOR FORMING CROSSLINKED SECOND ORDER NONLINEAR OPTICAL POLYMERS

(75) Inventors: Ru Jong Jeng, Chelmsford; Jayant Kumar, Lowell, both of MA (US); Braja K. Mandal, Forrest Park, IL (US); Sukant Kishore Tripathy, Acton, MA (US)

(73) Assignee: University of Massachusetts Lowell, Lowell, MA (US)

( * ) Notice: Subject to any disclaimer, the term of this patent is extended or adjusted under 35 U.S.C. 154(b) by 0 days.

(21) Appl. No.: 07/967,787

(22) Filed: Oct. 28, 1992

Related U.S. Application Data

(63) Continuation-in-part of application No. 07/625,301, filed on Dec. 7, 1990, now abandoned.

(51) Int. Cl.$^7$ ............................... C08F 2/48; C08L 63/10
(52) U.S. Cl. .................. 522/103; 522/135; 522/136; 522/137; 522/141; 522/142; 522/149
(58) Field of Search ................. 522/62, 149, 75, 522/59, 65, 35, 904, 114, 117, 119, 116, 118, 103, 137, 136, 135, 141, 142

(56) References Cited

FOREIGN PATENT DOCUMENTS

| | | |
|---|---|---|
| 0313475 | 9/1988 | (EP) . |
| 0313476 | 9/1988 | (EP) . |
| 0321891 | 12/1988 | (EP) . |

OTHER PUBLICATIONS

M. Eich et al., *J. Appl. Phys.*, 66(7): 3241–3247 (1989).

B. Reck et al., *SPIE*, 1147: 74–83 (1989).

K.D. Singer et al., *Appl. Phys. Lett.*, 53: 1800–1802 (1988).

M.A. Mortazavi et al., *J. Opt. Soc. Am. B..*, 6(4): 733–741 (1989).

*Primary Examiner*—Susan W. Berman
(74) *Attorney, Agent, or Firm*—Hamilton, Brook, Smith & Reynolds, P.C.

(57) ABSTRACT

Crosslinkable polymers which can exhibit second order nonlinear optical properties and methods of forming and crosslinking such polymers are disclosed. The crosslinkable polymers are combined with a crosslinking agent. Optionally, the crosslinking agent can exhibit second order nonlinear optical properties. In one embodiment, the crosslinking agent is thermally reactive. Alternatively the crosslinking agent is photoreactive. The combined polymer and crosslinking agent are exposed to an electric field which is sufficient to cause a component of the polymer which can exhibit second order nonlinear optical properties to be poled. The polymer is then crosslinked by the crosslinking agent. The crosslinking agent can be a guest compound that is-covalently bound to the polymer, which operates as a host compound.

12 Claims, 12 Drawing Sheets

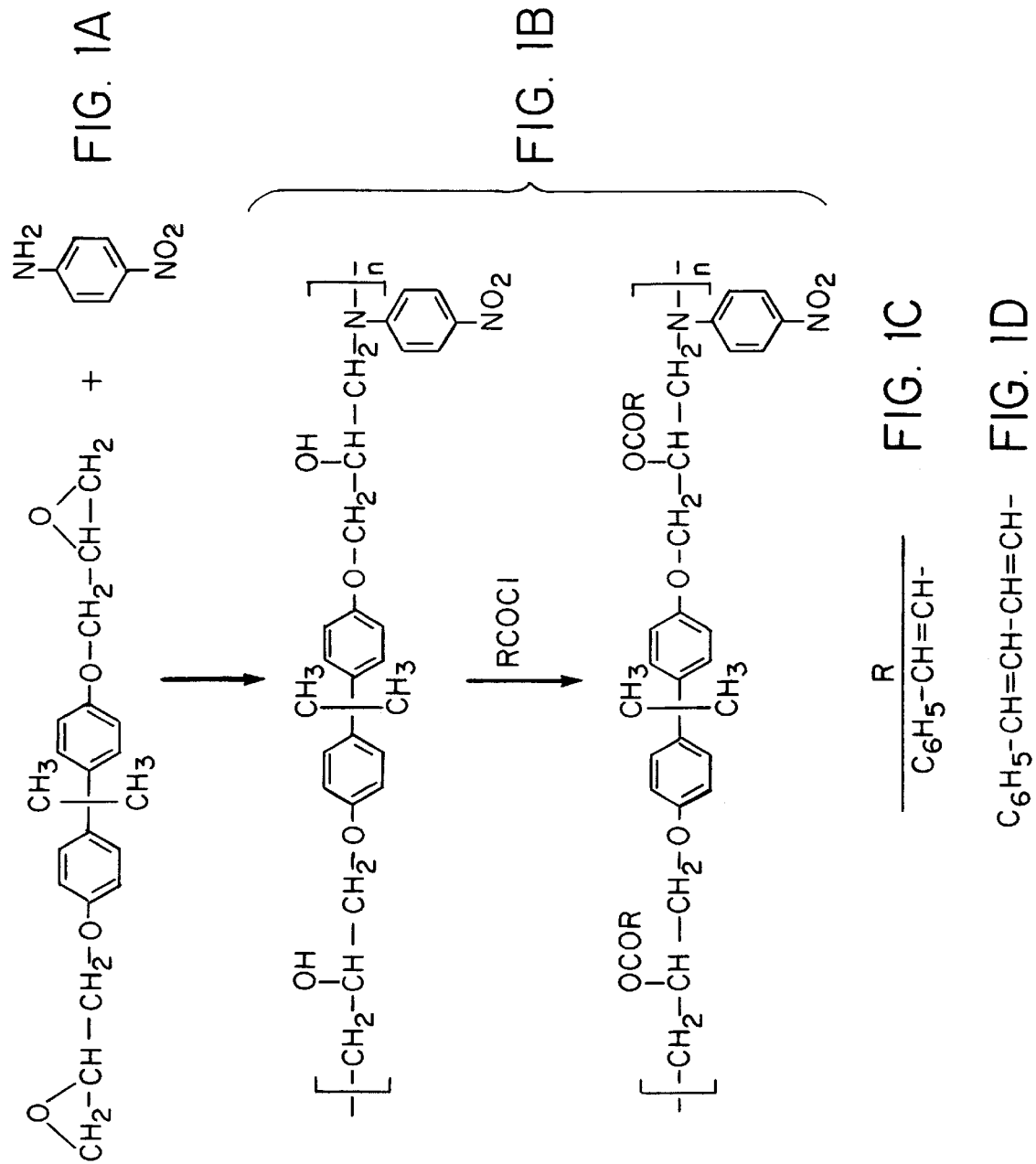

METHOD AND CROSSLINKABLE POLYMERS FOR FORMING CROSSLINKED SECOND ORDER NONLINEAR OPTICAL POLYMERS

RELATED APPLICATIONS

This is a continuation-in-part of U.S. Ser. No. 07/625,301, filed Dec. 7, 1990, now abandoned, the teachings of which are incorporated by reference herein.

GOVERNMENT FUNDING

This invention was made with support from the Government, Contract No. ONR 06-5485-F, which has certain rights in the invention.

BACKGROUND OF THE INVENTION

Efficient second order nonlinear optical (NLO) processes can usually be achieved only in materials having both a large second order nonlinear hyperpolarizability tensor, $\beta$, at a molecular level, combined with a noncentrosymmetric bulk structure. Studies of NLO properties in organic crystals and powders were initiated almost simultaneously with that of inorganic crystals more than two decades ago. Certain organic crystals satisfy both of the above criteria and show bulk second order nonlinear properties considerably larger than that of traditional inorganic materials, like potassium dihydrogenphosphate (KDP) or lithium niobate ($LiNbO_3$). However, they do not adequately meet the required standards for practical use in optical devices mainly owing to the great difficulty of growing crystals of sufficient size and quality. Systematic studies of organic materials and comprehensive theoretical explanations of their nonlinear behavior have been emphasized in a number of monographs, for example, in *Nonlinear Optical Properties of Organic Materials and Devices*, Williams (Ed.), American Chemical Society, Washington, D.C. (1983).

Oriented polymer systems provide an attractive alternative because of their low cost, wide variety and ease of processing. Polymer systems are conveniently prepared either by incorporating the NLO molecules into a suitable polymer matrix or by attaching the NLO molecules covalently to a polymer backbone or side chains. They will be referred hereafter as the 'doped' and the 'functionalized' polymers or systems, respectively. In both of these systems, the nonlinear optical response arises from the NLO moieties. The 'moieties' herein referred to are the organic NLO molecules dispersed in a polymer matrix or the NLO units that are attached to the polymer chains. Background information relating to the principals of nonlinear optical polymers, is contained in *Nonlinear Optical and Electroactive Polymers*, Prasad and Ulrich, (Eds.) Plenum Press, (1988).

Organic NLO molecules when doped in or functionalized to a polymer matrix, are in an isotropic centrosymmetric organization to begin with. It is essential to establish that the NLO moieties pack the bulk in a noncentrosymmetric fashion for the applications discussed earlier. This is effectively done by using an external electric field, e.g., corona poling, parallel plate poling or integrated electrode poling. The polymer system, after being subjected to an electric field, is referred to as a 'poled' polymer. A number of poled polymeric systems which show large nonlinear activity have been reported in recent literature references. Mohlmann et al., *SPIE*, 1147:245 (1989). However, the decay in nonlinear activities with time handicaps the realization of practical NLO polymers. This is due to the deorientation of the NLO moieties when the electric field is withdrawn.

Polymer systems having inter- and intramolecular crosslinking, have been developed to overcome the relaxation problem associated with the doped and functionalized polymers. Reck et al., *SPIE*, 1147:74 (1989); Eich et al., *J. Appl. Phys.*, 66(7):3241 (1989). In this system, polymers which exhibit second order nonlinear optical properties are disclosed which are formed by forming a network polymer from monomers during exposure to an electric field. However, network polymerization can substantially interfere with poling of nonlinear optical components, thereby significantly diminishing the optical quality of the resulting network polymer.

Co-pending U.S. Pat. No. 5,112,881, issued to B. Mandal et al. discloses an alternative approach for obtaining crosslinked, second order NLO polymers. Inter- and intramolecular photochemical reactions are used to crosslink the polymer matrix. In this system, a polymer and NLO molecules bearing similar photocrosslinkable compound are processed like a doped polymer. The system can be poled and photocrosslinked in the poled state to yield a material with stable optical nonlinearity.

SUMMARY OF THE INVENTION

This invention relates to a method and a crosslinkable polymer for forming crosslinked nonlinear optical polymers which exhibit second order nonlinear optical properties.

The method includes combining a host polymer, which can exhibit second order nonlinear optical properties, with a guest crosslinking agent. The combined host polymer and guest crosslinking agent are exposed to an electric field to pole a nonlinear optical component of the host polymer. Optionally, the guest crosslinking agent can be covalently bonded to the polymer prior to crosslinking. Also, the guest crosslinking agent can exhibit second order nonlinear optical properties. The combined host polymer and guest crosslinking agent are then exposed to sufficient electromagnetic radiation to crosslink the host polymer, thereby forming a crosslinked polymer which exhibits second order nonlinear optical properties. Examples of suitable forms of electromagnetic radiation include light and heat.

The crosslinkable polymer includes a nonlinear optical component that can be poled to cause the polymer to exhibit second order nonlinear optical properties. The polymer also includes a crosslinking agent which can crosslink the polymer while the nonlinear optical component is in the poled position, thereby forming a crosslinked polymer which exhibits second order nonlinear optical properties.

The crosslinked polymers produced by the present method have several advantages. They are easy to prepare, exhibit ultra-fast response times, show stable second order properties at elevated temperatures, perform over a broad wavelength range and have a high laser damage threshold. A unique feature of the polymers produced by this system is the high resolution obtainable in lithographic writing. The process of poling is independent of the crosslinking process in the present method, allowing them to be superimposed in a desired manner. The present crosslinked, polymeric materials are particularly suitable for second order NLO processes, such as second harmonic generation (SHG), electro-optic modulation, frequency mixing and optical parametric oscillation. They also possess excellent optical quality, stable nonlinearity and large electro-optic coefficients.

BRIEF DESCRIPTION OF THE FIGURES

FIG. 1 is a schematic illustration of one embodiment of a synthetic scheme employed by the method of the invention.

DETAILED DESCRIPTION OF THE INVENTION

Figure 2A:
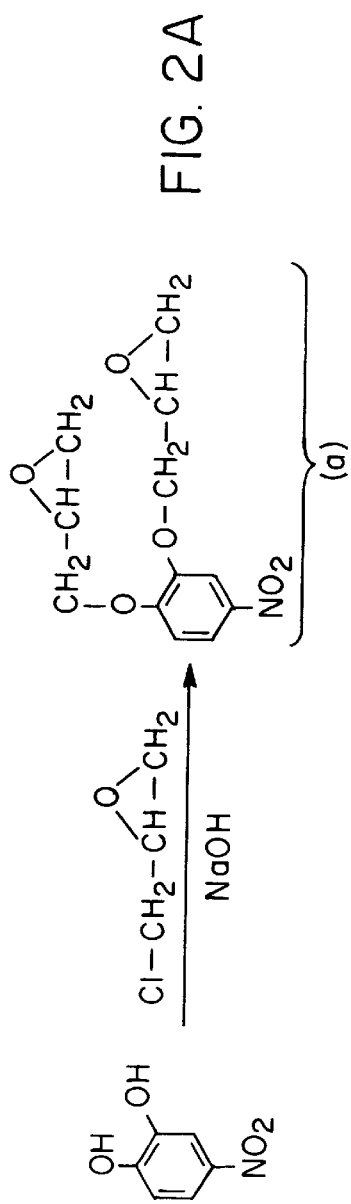
FIG. 2 is a schematic illustration of another embodiment of a synthetic scheme employed by the method of the invention.

The features and other details of the method and crosslinkable polymer of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

The invention generally relates to a method for forming a crosslinked polymer which exhibits second order nonlinear optical properties. The invention also relates to a crosslinkable polymer which can exhibit second order nonlinear optical properties. The method includes combining a host polymer which can exhibit second order nonlinear optical properties with a guest crosslinking agent. In one embodiment, the guest crosslinking agent can, itself, exhibit second order nonlinear optical properties. The combined polymer and guest crosslinking agent are exposed to an electric field to pole a nonlinear optical component of the host polymer, whereby the host polymer exhibits second order nonlinear optical properties. The host polymer and the guest crosslinking agent are exposed to electromagnetic radiation to cause the guest crosslinking agent to crosslink the host polymer, thereby forming a crosslinked polymer which exhibits second order nonlinear optical properties.

The guest crosslinking agent can react with the host polymer to form the crosslinkable polymer of the invention. The electromagnetic radiation to which the host polymer and the guest crosslinking agent are exposed to crosslink the host polymer can be, for example heat or light. Heat, for example, is a suitable form of electromagnetic radiation in an embodiment wherein the crosslinking agent is thermally reactive. Alternatively, light is a suitable form of electromagnetic radiation for use in the method of the invention when the crosslinking agent is photoreactive.

In one embodiment of the invention, the crosslinkable polymers of the invention are photocrosslinkable polymers prepared by a polymerization reaction between at least two monomers, at least one of which contains an NLO moiety. "NLO moiety," as that term is employed herein, means a chemically reactive compound which can exhibit second order nonlinear optical properties.

The other monomer can include a photoreactive compound, or a functional group which can be post-functionalized with the photoreactive compound. An example of a suitable photoreactive compound is a suitable chromophore. Alternatively, the other monomer forms a suitable thermally reactive crosslinking agent when employed to form a crosslinkable polymer of the present invention. In still another embodiment, the monomer can be post-functionalized with a suitable thermally reactive crosslinking agent to form a crosslinkable polymer of the present invention. An example of a suitable monomer which can thermally crosslink the resulting crosslinkable polymer includes 2,4 acryloyloxy(4'-phenylazo-nitrobenzene). An example of a suitable combination of a monomer and a thermally reactive crosslinking agent which can be employed to post-functionalize a resulting polymer to form the thermally crosslinkable polymer includes BPAZO, an epoxy polymer of diglycidylether of bisphenol A and 4(4'-nitrophenylazo)phenylamine. The BPAZO is functionalized with reactive acryloyl groups, as described in Mandal et al., *Makromol. Chem. Rapid Commun.*, 12, 607 (1991), the teachings of which are incorporated herein by reference.

The selected routes for preparing the present photocrosslinkable polymers include traditional polymerization reactions such as condensation addition, free-radical and ring-opening polymerizations, which can be employed to synthesize polymers bearing the NLO moieties and photoreactive compound. For example, polymers formed by the condensation reaction of an NLO active diol (e.g., 4-nitrocatechol, 4-(N,N-bisethanol)-phenylazo] nitrobenzene) and a photoreactive diacidchloride (e.g., o-phenylenediacryl chloride, m-phenylenediacryl chloride and p-phenylenediacryl chloride) fall in this category. These and other similar polymers can be produced by the present process. A number of different photocrosslinkable polymers which include NLO components can be formed using a suitable synthetic protocol.

In a preferred embodiment of the present invention, the crosslinkable polymers are formed by reacting an epoxy-functional compound, which can include an NLO moiety, and an amino-functional compound which is attached to an NLO moiety. The resulting polymer is a hydroxy-functional polymer having NLO moieties which are either incorporated in the backbone chain of the polymer, or pendent from the main chain, or both.

Epoxy compounds which can be used in the present reaction include, for example, bifunctional epoxy compounds prepared by the reaction of epichlorohydrin with a polyol, such as bisphenol A, catechol, resorcinol, glycol and glycerol. Epoxy compounds which are particularly useful include bisphenol-A diglycidylether, catechol diglycidylether, and resorcinol diglycidylether. Epoxy compounds containing NLO moieties are prepared by reacting a hydroxy-functional NLO molecule with epichlorohydrin. For example, the reaction of one equivalent of 4-nitrocatechol with two equivalents of epichlorohydrin forms a bifunctional epoxy monomer containing the NLO moiety. Bifunctional epoxy compounds containing NLO moieties can also be prepared by reacting a primary amine with two equivalents of epichlorohydrin. Epoxy compounds containing NLO moieties which are useful in the present invention include, for example, 4-nitrocatechol diglycidylether, N,N-diglycidyl-r-nitroaniline and N,N-diglycidyl-4-(4-aminophenylazo) nitrobenzene. A number of epoxy compounds described by Reck et al., SPIE, 1147:74 (1989); and Eich et al., J. Appl. Phys., 66(7):3241 (1989), for use in thermally crosslinked systems, in which the epoxy groups are linked to a $\pi$-moiety through a nitrogen atom, are useful as starting materials in the present method. The teachings of Reck et al., SPIE, 1147:74 (1989); and Eich et al., J. Appl. Phys., 66(7):3241 (1989) are incorporated herein by reference.

Preferably, NLO molecules having large $\beta$ values are used, because large $\beta$ value is one of the prerequisites for efficient second order NLO process. NLO molecules which exhibit large $\beta$ values include organic molecules bearing at least one electron donor and one electron acceptor group attached to a $\pi$-moiety. The electronic charge distortion in these molecules arises from the charge-transfer between the donor-acceptor groups and creates the desired nonlinear optical effect.

The terms 'donor' and 'acceptor' as used herein refer to functional groups which either 'donate' or 'accept' $\pi$-electrons, respectively. The nitro group ($-NO_2$) is the preferred $\pi$-acceptor although other groups such as cyano ($-CN$) are also used. NLO molecules bearing other acceptor groups, in addition to nitro ($-NO_2$) and cyano ($-CN$), including sulfonyl derivatives ($-SO_2R$, where $R=-CH_3$, $-CF_3$, $-NH_2$, etc.), pyridinium salts and N-oxide, are useful in the present invention. The $\pi$-donor group is generally nitrogen, in the form of an amino group ($-NH_2$). However, donor groups attached through other atoms, such as oxygen, can also be employed. For example, donor groups which are also useful include substituted amines having the formula $\pi$-$N(CH_3)CH_2-$ and substituted alkoxy groups having the formula $\pi-OCH_2-$, wherein $\pi$ is an aromatic ring structure, as described in detail hereinbelow. Useful substituted amines and alkoxy groups include, for example, N,N-dimethylamine ($-N(CH_3)CH_2-$), N,N-diethylamine ($-N(C_2H_5)C_2H_4-$), methoxy ($-OCH_2-$), and ethoxy ($-OCH_2CH_2-$) groups.

The $\pi$-moiety can be any system rich in $\pi$-electrons, such as a benzene ring. Large $\beta$ values are observed in the NLO molecules containing an extended conjugated $\pi$-electron system. For example, biphenyl (where two benzene rings are connected through a single bond), diazo (where two benzene rings are connected through a $-N=N-$ moiety), azomethine (where two benzene rings are connected through a $-N=CH-$ moiety) and stilbene (where two benzene rings are connected through a $-CH=CH-$ group) are particularly useful conjugated systems. Hence, higher magnitudes of the nonlinear effects in appropriate molecular arrangements can be obtained by molecular engineering and synthetic tailoring.

In one embodiment of the present invention, NLO molecules are used in which the $\pi$-moiety is a benzene ring, the acceptor group is a nitro ($-NO_2$) group and the donor group is an oxygen or nitrogen donor. More specifically, the donor groups are attached to the $\pi$-moiety in the form of $\pi-OCH_2-$ and $\pi-N(CH_3)CH_2-$. NLO molecules which can be used, in the present invention are described in detail in U.S. Pat. No. 5,112,881, which is incorporated herein by reference.

Amino-functional NLO compounds which are useful in the present invention are compounds which contain at least one primary amino group. Amino-functional NLO compounds which are useful in the present invention include, for example, p-nitroaniline, 3,4-diaminonitrobenzene, and 4-(4'-aminophenylazo)nitrobenzene.

The epoxy compound and the amino-functional NLO molecule are polymerized to form hydroxy-functional polymers, which are then further reacted with photoreactive compound to form the present crosslinkable polymers. In the first step of the method, the epoxy compounds and the amino-functional NLO compounds of choice are combined under conditions sufficient to cause the epoxide rings to open and to react with the amino nitrogens, thereby forming a polymer having hydroxy-functional groups and NLO groups which are pendent from the polymer backbone chain. This embodiment is illustrated in the first reaction shown in FIG. 1.

In another embodiment of the present method, the NLO moiety is incorporated into the epoxy compound as described above, by reacting epichlorohydrin with a dihydroxy NLO molecule, forming a bifunctional epoxy NLO molecule, which is then further reacted with an amino-functional NLO molecule as described above, forming a hydroxy-functional polymer. This embodiment is illustrated in the first two reactions shown in FIG. 2.

The resulting polymer will be a linear or a branched polymer, depending on the functionalities of the amino and epoxy components. A linear polymer is formed, for example, when the two components are bifunctional. Branched polymers are formed when one of the components is at least trifunctional and the other is at least bifunctional. Both linear and branched polymers are useful in the present invention.

In the second step of the reaction, the polymer formed in step 1 is functionalized with a photoreactive compound to form the photocrosslinkable polymer. In this step, the polymer hydroxy-functional groups of the polymer react with an acid chloride of the photoreactive compound under conditions which cause the compound to become esterified to the polymer. This step is illustrated in the second reaction shown in FIG. 1. Hydroxy-functional polymer 1b reacts with the acid chloride of the photoreactive compound, shown as RCOCl, wherein R is a chromophore, and the chormophore becomes esterified to the polymer, resulting in formation of a photocrosslinkable polymer. The second step of the reaction is further illustrated in FIG. 2 in which polymer 2b reacts with the acid chloride of the chromophore, resulting in formation of a photocrosslinkable polymer.

A number of photoreactive compound can be used in the present invention. For example, compound useful in the classical photocrosslinking reactions of polymers, described in Reiser, Photoreactive Polymers, (1989), the teachings of which are hereby incorporated by reference, can be employed. Two photoreactive compound, cinnamoyl ($C_6H_5-CH=CH-CO-$) and styrylacryloyl ($C_6H_5-CH=CH-CH=CH-CO-$), which crosslink at different wavelengths were chosen to demonstrate the principles of the said invention. However, a broad range of compound which can be crosslinked under the conditions of the present method can be used.

A three-dimensional polymer is then produced by inter- and intramolecular photocrosslinking of the photocrosslinkable polymers described above.

The following embodiment will be used to illustrate the preparation of the present crosslinked polymers. In one embodiment, shown schematically in FIG. 1, an epoxy compound, bisphenol-A diglycidylether, (Formula 1a, FIG. 1), which contains no NLO moiety, is first reacted with p-nitroaniline. Compound 1a can be obtained from a commercially available source (e.g., Epon® 828, Shell Chemical Co., Houston, Tex.). This reaction generates a polymer which include hydroxy-functional groups (Formula 1b, FIG. 1). In the second step of the reaction, the hydroxy-functional groups are coupled with photoreactive compound by an esterification reaction with an acid chloride of the chromophore. Two specific polymers (shown as Formula 1c and 1d, FIG. 1) are prepared using cinnamoyl chloride ($C_6H_5$—CH=CH—COCl) and styrylacryloyl chloride ($C_6H_5$—CH=CH—CH=CH—COCl), respectively.

Figure 2B:
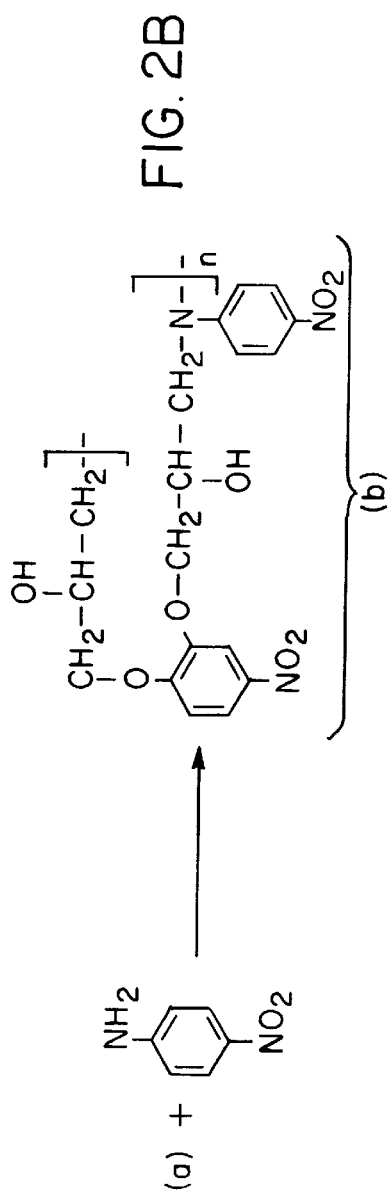

In another embodiment, similar reaction sequences as described above are performed except that the epoxy compound contains an NLO moiety. The epoxy compound, 4-nitrocatechol diglycidylether (Formula 2a, FIG. 2) is prepared from 4-nitrocatechol and epichlorohydrin by the method described by Brydson, *Plastic Materials*, London, Butterworths, pp. 669 (1982), the teachings of which are herein incorporated by reference. The reaction is shown schematically in FIG. 2. Epoxy compounds in which the epoxy groups are attached through the nitrogen atom of a NLO molecule can also be used as the NLO active epoxy compound. A number of such compounds, including N,N-diglycidyl-4-nitroaniline and N,N-diglycidyl-4-[4-aminophenylazo]nitrobenzene are particularly useful. See, for example, Reck et al., *SPIE*, 1147:74 (1989). The NLO-containing epoxy-compound (2a) is then reacted with the amino-functional NLO compound as described above. The resulting hydroxyl-containing polymer (2b) is then reacted with the acid chloride of the chromophore (RCOCl). The synthetic schemes for making the present functionalized polymers and the attachment of photoreactive compound are shown in FIG. 2. Formulae 2c and 2d are the polymers which contain NLO moieties in the backbone chain and are also pendent from the chain, wherein the photoreactive compounds are cinnamoyl and styrylacryloyl, respectively.

In the model systems used above to illustrate the present invention, the functionalized crosslinkable polymers (1c), (1d), (2c) and (2d) are attached with two different photoreactive compound, cinnamoyl and styrylacryloyl groups. The cinnamoyl group has an absorption maximum at about 280 nanometers (nm), but the crosslink-generating photoreaction can be performed, at a slower rate, at a wavelength of 254 nm as well. The styrylacryloyl group absorbs at longer wavelengths (e.g., about 330 nm) and undergoes crosslinking reaction very fast, even at 366 nm.

In general, the photoreactive compound can be made to function at wavelengths of about 200 to 700 nm as a result of the judicious use of specific compound with specific sensitizing agents. There are a large number of compounds that sensitize cinnamoyl and styrylacryloyl groups in the near-ultraviolet region and significantly increase the photoreactivity of the composition. For example, thiazolines (N-methyl-benzoyl-β-naphthathiazoline), nitroaromatics (3-nitroacenaphthalene) and ketocoumarins (7-propyloxy-3-benzoylcoumarin) represent three major classes of sensitizers, among others. They absorb at longer wavelengths and funnel this energy to a reactive site. Hence, the choice of the photocrosslinkable polymer/sensitizer combination permits tailoring of the system to respond to specific light sources and wavelengths.

The photocrosslinkable polymers described above are self-sufficient for obtaining a crosslinked, second order NLO polymer. However, they can also be processed with guest molecules bearing one or more photoreactive compound prior to the photocrosslinking reaction. The 'guest' molecule herein can be a NLO molecule or any specific organic molecule depending on the requirements of the final crosslinked matrix. Hence, the present invention provides the advantage of incorporating special features through the guest molecules.

Figure 2C:
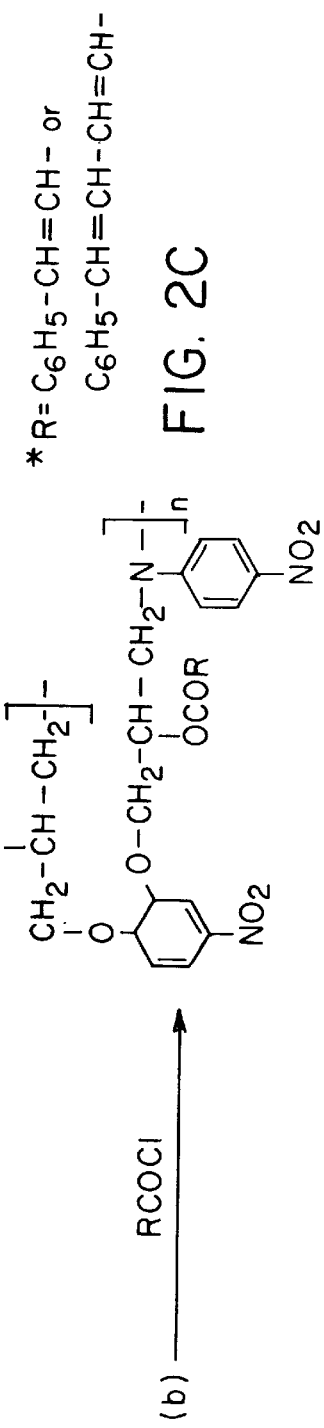

In one embodiment of the present invention, a guest molecule is used to react with a photocrosslinkable polymer. For example, a guest molecule having the formula shown as Formula 3, below, wherein nitro is the acceptor group, N,N-diethylamine is the donor group, diazo is the extended π-conjugated moiety, and R is either cinnamoyl or styrylacryloyl as the photoreactive group, can be employed. The synthesis of this type of guest molecule is described in detail in U.S. Pat. No. 5,112,881. In one embodiment of the present invention, the crosslinkable polymer is photocrosslinkable and is shown in FIG. 2c, and the guest diazo compound is shown below, wherein R is $C_6H_5$—CH=CH—CO—:

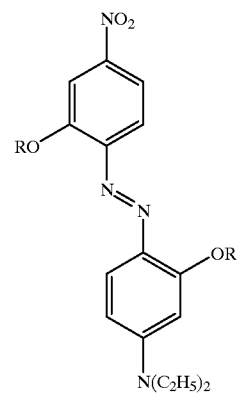

Alternatively, the crosslinkable polymer is thermally crosslinkable and has the following structural formula:

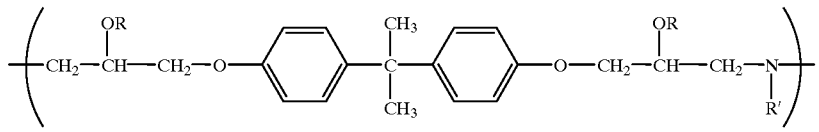

where

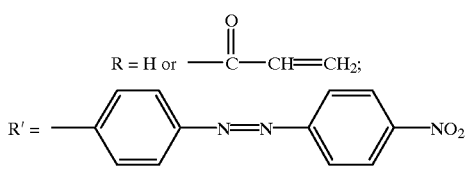

In this embodiment, an example of a suitable thermally reactive crosslinking agent is shown below:

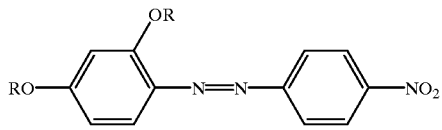

where

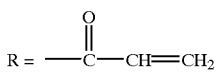

The present three-dimensional crosslinked polymers are prepared by the following general procedure. The crosslinkable polymer itself, or with guest molecules, can be cast in bulk or as films. A conventional spinning technique is employed for illustrative purposes in the present procedure. In this process, the crosslinkable polymer or the host polymer and guest molecules are dissolved in an organic solvent or solvent mixture. A broad range of solvents can be used. Polar organic solvents such as tetrahydrofuran (THF), 1,4-dioxane, propyleneglycol methylether acetate (PMAc) and a toluene:1-chorobenzene (1:3) mixture are good solvents to obtain desirable quality thin films. Thin films are produced by spin-coating the solution over a substrate such as glass, quartz or thermally grown silicon dioxide on silicon. Films having a thickness of from about 0.5 micrometer ($\mu$m) to about 2.5 $\mu$m can be easily obtained. Film thickness can be controlled by adjusting the spinning speed and/or the viscosity of the solution.

The cast films are allowed to dry, and are then "poled" to introduce noncentrosymmetric organization to the NLO moieties in the film. This can be accomplished, for example, by corona poling, parallel electrode poling or integrated electrode poling. Poling can be carried out as described in *Electrets*, edited by Sessler, Springer Verlag, Berlin, Germany, pp. 3 (1987), the teachings of which are incorporated hereon by reference. An efficient poling of the films is usually carried out at temperatures in the range of about 10° C. below or above the $T_g$ of the polymer. The applied voltage on the corona wire is varied depending on the thickness of the film and the temperature selected for poling. For most applications, the corona current is generally in the range of from about 1 to about 10 microAmperes ($\mu$A). The exact process conditions will be specific to the system and can be determined by routine experimentation.

Figure 3:
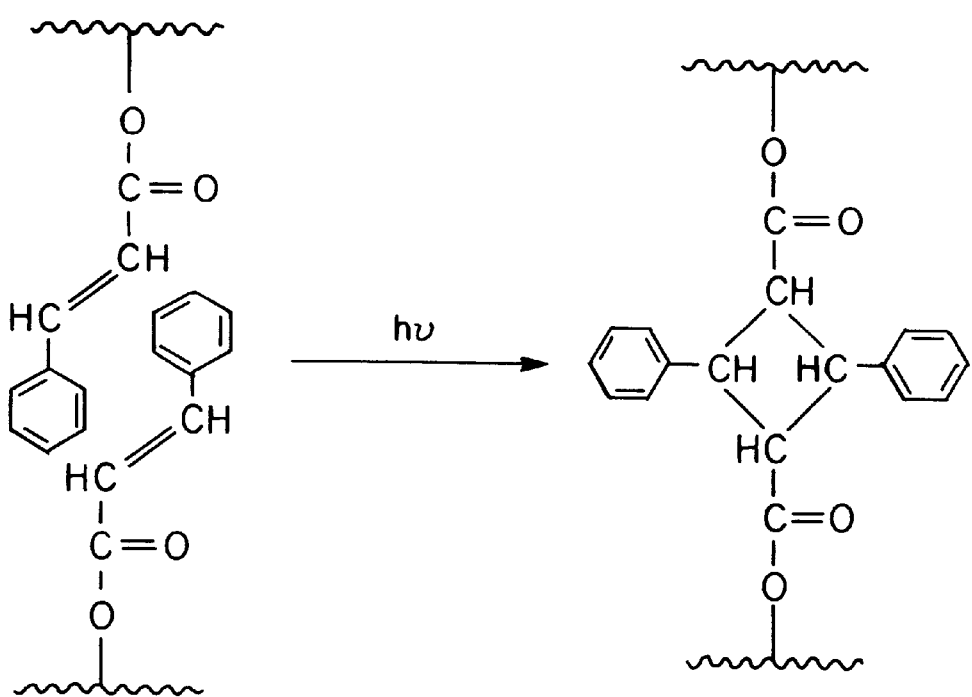
FIG. 3 is a schematic illustration of the photocrosslinking reaction between two photoreactive groups of one embodiment of a crosslinkable polymer of the present invention.

The NLO moieties are then permanently frozen in the preferred orientation by crosslinking, which occurs between the compound. Crosslinking is performed by exposure of the polymer and the crosslinking agent to a suitable form of electromagnetic radiation. The electromagnetic radiation can be, for example, light or heat. The wavelength of irradiation is selected depending on the absorption profile of the polymer matrix. In general, almost all films in which cinnamoyl and styrylacryloyl groups are the photoreactive groups can be photocrosslinked at a wavelength of about 254 and about 366 nm, respectively, which is in the ultraviolet (UV) range. Photocrosslinking reactions can occur between two similar and dissimilar photoreactive compound. A schematic illustration of a photocrosslinking reaction is represented in FIG. 3. The crosslinking reaction can be carried out over a wide frequency range of incident light. For example, an argon-ion laser can be used, generally with a small quantity of a commercially available sensitizer, such as 7-propyloxy-3-benzoylcoumarin. Photocrosslinking can be performed at a later portion of poling cycle while the electric field is on, or immediately after the poling field is removed.

The refractive index of the film can be measured by ellipsommetry. Typically, one of the films prepared according to the protocol set out above having a 1 $\mu$m thickness has refractive index of 1.613 for the poled and 1.631 for the unpoled films in the plane of the film at a wavelength of 532 nm.

The nonlinear optical properties of the poled films can be investigated by using SHG as the probing technique. In this method, measurements are made on a Q-switched Nd-YAG laser in which a polarized beam of light is passed through the sample, and the second harmonic coefficient of the photocrosslinked polymer film, $d_{33}$, is obtained. Polymer matrices made by the present method show no decay in SHG over long periods of time at elevated temperatures, for example, ranging from about 60 to 100° C.

In the model system in which cinnamoyl is the photoreactive compound, for example, a Q-switched Nd:YAG laser ($\lambda$=1064 nm) with a pulse of 10 nanoseconds (ns) and a pulse energy of 45 millijoules (mJ) is used as the fundamental source, and a reference sample of Y-cut quartz ($d_{11}$=0.364 picometers/volt (pm/V)) is used as a standard for the calibration of the frequency-doubled signal. The second harmonic coefficient of the polymer film, $d_{33}$, is determined from a Maker-type fringe analysis of the data. Details of the calculations are reported by Jephagnon et al., *J. Appl. Phys.*, 41:1667 (1970), the teachings of which are incorporated herein by reference.

The value of $d_{33}$ obtained is from about 3 to 47 pm/V for the present systems. By optimizing the degree of alignment, the concentration of the NLO moieties and the β tensor of the NLO moieties in the polymer matrix, the second order coefficient can be further varied.

The invention will now be further illustrated by the following examples.

EXAMPLES

Example 1

The synthetic route for obtaining the photocrosslinkable polymers shown as Formula 1c and 1d is shown schematically in FIG. 1. The hydroxy-functional polymer shown as in FIG. 1b was made by reacting 3.94 g of bisphenol A-diglycidyl ether, BPA-DGE (compound 1a) and 1 gm of p-nitroaniline at 140° C. for 4 h and 160° C. for 3 hours in a sealed tube. Unreacted p-nitroaniline was removed from the crude mixture by vacuum sublimation at 140° C. for 1 hour.

The photocrosslinkable polymers 1c and 1d were made by reacting the functionalized polymer 1b with cinnamoyl chloride and styrylacryloyl chloride respectively. In the first reaction, cinnamoyl chloride (3.5 g) in 15 ml tetrahydrofuran (THF) was added dropwise to a solution of 1b (3.5 g) and triethylamine (10 ml) in THF (15 ml) and stirred for 24 h at room temperature. The dark brown solution was precipitated in methanol (800 ml). The product (1c) was filtered, washed with methanol and dried under reduced pressure at room temperature.

In the other reaction, styrylacryloyl chloride (4 gm) in 15 ml THF was added dropwise to a solution of 1b (4 gm) and triethylamine (10 ml) in THF (15 ml) and stirred for 24 hours at room temperature. The dark brown solution was precipitated in to methanol (900 ml). The product (1d) was filtered, washed with methanol and dried under reduced pressure at room temperature.

One gram of polymer 1c was dissolved in 5 ml of propylene glycol methylether acetate (PMAc) using an ultrasonic mixer at room temperature. The resulting solution was used to spin-coat a glass substrate at 1250 to 4000 rpm for 1 min. Prebaking of the sample was done immediately after spin-coating at room temperature under vacuum for 24 hours.

The substrate was kept on the hot-stage of the poling equipment for 1 min. at 80° C. prior to the poling, and photocrosslinking cycles. The film was corona poled for 6 min. The applied voltage on the corona wire was maintained at 6 kilovolts (kV) while the corona current of approximately 5 microamperes ($\mu$A) was established. The poled film was then crosslinked for 12 min. by UV irradiation. A radiation dosage of 3 milliwatts (mW)/cm$^2$ at wavelength 254 nm was maintained during the crosslinking reaction. Sudden cooling of the substrate was done after UV irradiation by passing cold water through the hot-stage. The poling field was kept on during both the radiation and cooling cycles.

Spin-coating and poling of polymer 1d was performed similar to 1c. The poled film was crosslinked for 3 min. using a radiation dosage of 15 mW/cm$^2$ at wavelength 366 nm.

The chemical attachment of photoreactive groups to functionalized polymers, the storage of all photocrosslinkable polymers and the processing prior to photocrosslinking reaction were done in the absence of UV light.

Various properties of the resulting crosslinked polymers were identified and are summarized in Table 1, shown below:

TABLE 1

Properties of NLO Polymers

| Polymer | 1c | 1d | 2c | 2d | 2c/(3 at 10%) |
|---|---|---|---|---|---|
| Thickness ($\mu$m) | 0.70 | 0.40 | 1.09 | 0.87 | 0.36 |
| Absorption maximum (nm)[a] | 385 | 373 | 318 | 318 | 526 |
| PDT (° C.)[b] | 275 | 275 | 261 | 260 | 250 |
| $T_g$ (° C.)[c] | 76 | 80 | 78 | 82 | 77 |
| Refractive index wavelength ($\mu$m) | | | | | |
| 0.532 | 1.638 | 1.696 | 1.664 | 1.711 | 1.627 |
| 0.632 | 1.635 | 1.680 | 1.627 | 1.656 | 1.670 |

TABLE 1-continued

Properties of NLO Polymers

| Polymer | 1c | 1d | 2c | 2d | 2c/(3 at 10%) |
|---|---|---|---|---|---|
| 1.064 | 1.556 | 1.621 | 1.612 | 1.627 | 1.602 |
| $d_{33}$ (pm/V) | 3 | 5 | 3 | 5 | 13 |

[a]Measurements were made on Perkin-Elmer Uv-Lambda-9 spectrophotometer.
[b]Product decomposition temperature (PDT) obtained from a Model 2000 thermogravimetric analyzer, commercially available from E.I. du Pont de Nemours & Co.
[c]Obtained from a Model 2910 differential scanning calorimeter, commercially available from E.I. du Pont de Nemours & Co., 10° C./min. (midpoint).

Example 2

The synthetic route for obtaining the photocrosslinkable polymers shown as Formulae 2c and 2d is shown schematically in FIG. 2. In this reaction, the epoxy compound 4-nitrocatechol diglycidylether (2a) was prepared according to the method described in the literature for BPA-DGE. Brydson, Plastics Materials, London, Butterworths, pp. 669 (1982), the teachings of which are incorporated herein by reference. 4—Nitrocatechol was used instead of bisphenol-A. The hydroxy-functional polymer 2b, shown in FIG. 2, was made by reacting 6.76 gm of the bifunctional epoxy compound 2a and 3.5 gm of p-nitroaniline at 140° C. for 1 hour and 160° C. for 10 hours in a sealed tube. Unreacted p-nitroaniline was removed from the crude mixture by vacuum sublimation at 140° C. for 1 hours.

The photocrosslinkable polymers 2c and 2d were made by reacting the functionalized polymer 2b with cinnamoyl chloride and styrylacryloyl chloride. In the first reaction, cinnamoyl chloride (4 gm) in 15 ml THF was added dropwise to a solution of 2b (4 gm) and triethylamine (10 ml) in THF (15 ml) and stirred for 24 hours at room temperature. The dark brown solution was precipitated in to methanol (800 ml). The product (2c) was filtered, washed with methanol and dried under reduced pressure at room temperature.

In the other reaction, styrylacryloyl chloride (4 gm) in 15 ml THF was added dropwise to a solution of 2b (4 gm) and triethylamine (10 ml) in THF (15 ml) and stirred for 24 hours at room temperature. The dark brown solution was precipitated in methanol (900 ml). The product (2d) was filtered, washed with methanol and dried under reduced pressure at room temperature.

1 gm of 2c was dissolved in 5 ml of PMAc using an ultrasonic mixer at room temperature. The resulting solution was used to spin-coat a glass substrate at 1250 to 4000 rpm for 1 min. Prebaking of the sample was done immediately after spin-coating at room temperature under vacuum for 24 hours.

The substrate was kept on the hot-stage of the poling equipment for 1 min. at 80° C. prior to the poling, and photocrosslinking cycles. The film was corona poled for 6 min. The applied voltage on the corona wire was maintained at 6 kV while the corona current of approximately 5 $\mu$A was established. The poled film was then crosslinked for 12 min. by UV irradiation. A radiation dosage of 3 mW/cm$^2$ at wavelength 254 nm was maintained during the crosslinking reaction. Sudden cooling of the substrate was done after UV irradiation by passing cold water through the hot-stage. The poling field was kept on during both the radiation and cooling cycles.

Spin-coating and poling of polymer 2d was performed similar to 2c. The poled film was crosslinked for 3 min. using a radiation dosage of 15 mW/cm² at wavelength 366 nm.

The chemical attachment of photoreaction groups to functionalized polymers, the storage of all photocrosslinkable polymers and the processing prior to photocrosslinking reaction were done in the absence of UV light.

Various properties of the resulting polymers were identified and are summarized in Table 1, shown above.

Example 3

In this example, the photocrosslinkable polymer 2c is processed with a guest molecule comprising a NLO compound (Formula 3a, shown in FIG. 3) bearing similar photoreactive groups. The synthesis of compound 3a and related compounds is described in co-pending U.S. Pat. No. 5,112,881.

One gram of polymer 2c, prepared as described in Example 2, above, and 0.1 gm of (3),3-cinnamoyloxy-4-[4-(N,N-diethyl-amino)-2-cinnamoyloxyphenylazo] nitrobenzene were dissolved in 5 ml of PMAC using an ultrasonic mixer at room temperature. The resulting solution was used to spin-coat a glass substrate at 1250 to 4000 rpm for 1 min. Prebaking of the sample was done immediately after spin-coating at room temperature under vacuum for 24 hours.

The substrate was kept on the hot-stage of the poling equipment for 1 min. at 80° C. prior to the poling, and photocrosslinking cycles. The film was corona poled for 5 min. The applied voltage on the corona wire was maintained at 6 kV while the corona current of approximately 5 microamperes $\mu A$ was established. The poled film was then crosslinked for 12 min. by UV irradiation. A radiation dosage of 3 mW/cm² at wavelength 254 nm was maintained during the crosslinking reaction. Cooling of the substrate was done after UV irradiation by passing cold water through the hot-stage. The poling field was kept on during both the radiation and cooling cycles.

The processing of 2c with the guest NLO molecule and the storage of spin-coated substrates prior to photocrosslinking reaction were done in the absence of UV light.

Various properties of the polymers were identified and are summarized in Table 1, shown above.

Example 4

A. Materials

A crosslinking agent NLO dye, 2,4-acryloyloxy (4'-phenylazonitrobenzene) (APAN), was synthesized by the functionalization of hydroxy-functional groups of 4-(4'-nitrophenylazo) resorcinol (commercially available from the Aldrich Chemical Co., Inc.) into acryloyl moieties, and is shown below:

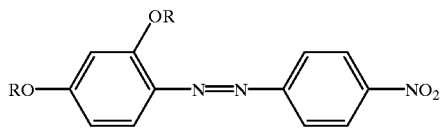

where;

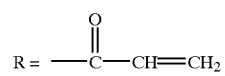

BPAZO, an epoxy polymer of diglycidyl ether of bisphenol A and 4(4'-nitrophenylazo) phenylamine, which was functionalized with reactive acryloyl groups, was formed as described in Mandal et al., *Makromol. Chem. Rapid Commun.*, 12, 607 (1991), the teachings of which are incorporated herein by reference. This was dissolved in mixed propylene glycol methyl ether acetate and 1,4-dioxane (volume ratio 3:1) with a weight ratio of 1:10. The solution was spin-coated onto glass slides, quartz slides and KBr plates, respectively, and then baked at 50° C. under vacuum for 12 hours. The typical thickness obtained was approximately 0.60 $\mu$m. Indices of refraction at 532 nm and 1000 nm were measured using an ellipsometer. The samples of the crosslinked quest-host system, BPAZO/APAN were prepared in the same manner as BPAZO. The weight ratio of BPAZO to APAN was 2:1. If the ratio is higher than 2:1, immiscibility is apparent in the thin films of this guest-host material.

B. Instruments

The glass transition temperatures, $T_g$, and the reaction behavior of the polymers were obtained from differential scanning calorimetry using a TA Instrument, DSC2910, at a heating rate of 10° K./min. The isotrack technique of DSC was applied to obtain the optimum curing conditions. The thermal degradation temperatures ($T_d$) of the polymers were determined on a TA Instrument, TGA2950, with a heating rate of 10° K./min. under air. UV/Vis spectra were recorded on a Perkin Elmer Lambda 9 spectrophotometer. Infrared spectra were recorded on a Mattson FTIR.

The poling technique used was corona poling in a wire-to-plane arrangement. Thin films of the polymers were poled and cured simultaneously. The poling was started at a temperature 10° C. below the $T_g$ of the polymer and then increased by 10° K./min. The crosslinking reaction proceeded reasonably fast only at temperatures above 140° C. When the poling temperature reached 140° C. The temperature was advanced at a rate of 1° C./min. The corona field was carefully controlled in order to avoid electrical breakdown due to the high conductivity of epoxy-type materials. The strength of the electric field used for poling was approximately 5.0 MV/cm. Thin films of the polymer were heated to a temperature at which the crosslinking was fast (approximately 160° C.) with the electric field on. After a time sufficient to bring the $T_g$ close to the curing temperature (2 hours), the sample was cooled to room temperature with the electric field on.

The second order nonlinear coefficient ($d_{33}$) of the poled thin film was measured by second harmonic generation (SHG) from 1064 nm laser radiation. The relaxation behavior of the second order nonlinear optical properties was studied by the decay of the second order nonlinear optical coefficient ($d_{33}$) as a function of time at both room temperature (25° C.) and at 100° C. after poling and curing. These measurements were made with a Q-switched Nd-YAG laser (Quantel 660A). A p-polarized incident beam was separated by a beam splitter. One of the beams was passed through the sample, and the other was passed through a y-cut quartz reference. Both fundamental waves were blocked using $CuSO_4$ solution. Two narrow band interference filters, which were centered around 532 nm, were used to allow the second harmonic (SH) beam to pass. The SH signals were detected by two photomultiplier tubes, one for the quartz reference and the other for the sample. The signals were amplified and averaged in a Stanford Research Model SR-250 boxcar integrator.

C. Thermal Analysis

Figure 4:
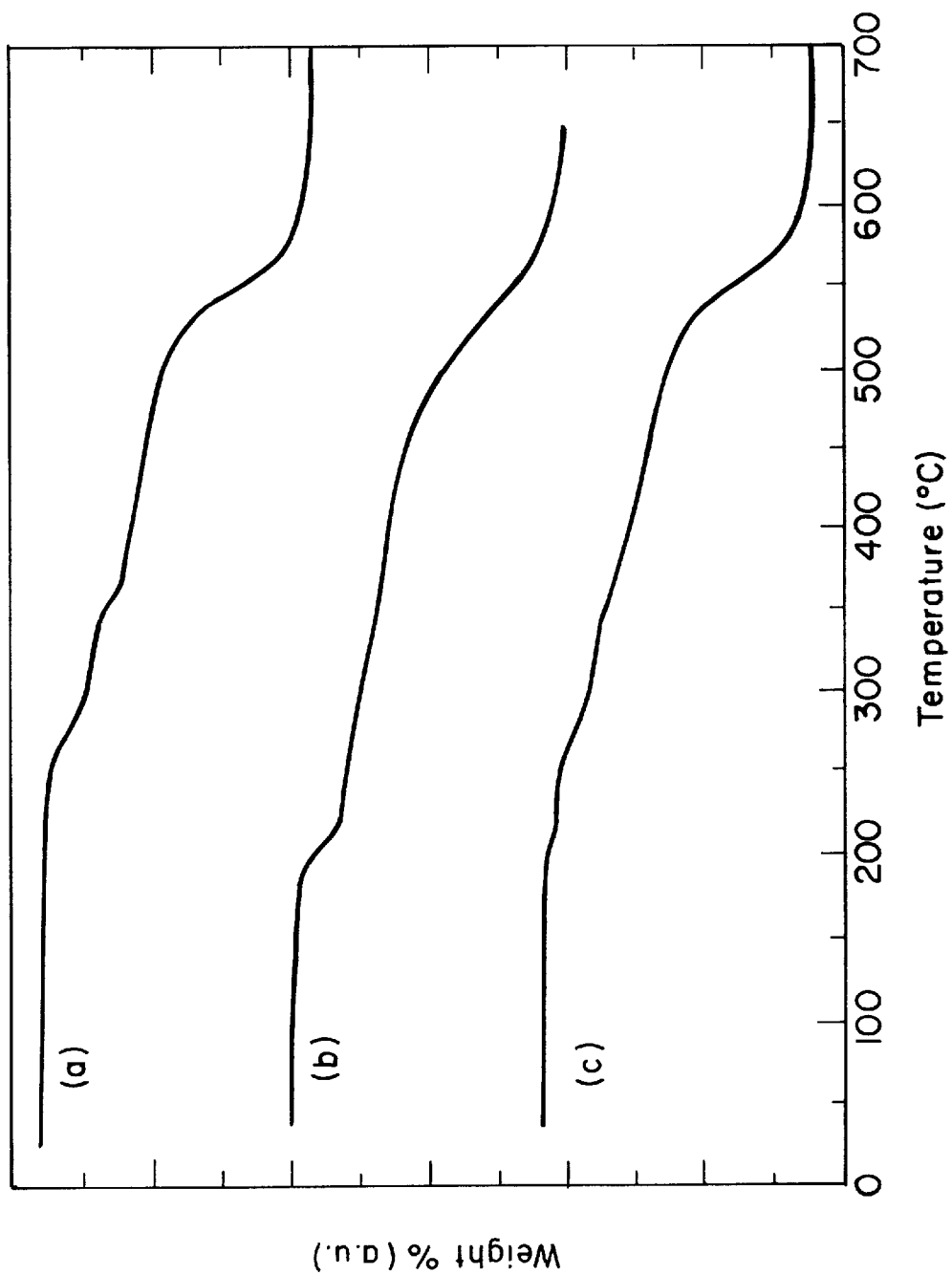
FIG. 4 includes thermographic plots (Curves (a) and (c)) of two embodiments of crosslinked polymers formed by the method of the invention. Curve (b) is a thermographic plot of a crosslinkable nonlinear optical dye.

Thermographic analysis (TGA) scans at 10° K./min of BPAZO, APAN, and BPAZO/APAN (weight ratio 2:1) are shown in FIG. 4, as curves (a), (b) and (c), respectively. The degradation temperatures, as taken from the onset point of the step transition, were 251° C., 187° C., and 197° C., respectively. The curing temperature was kept below 180° C. to avoid degradation.

Figure 5:
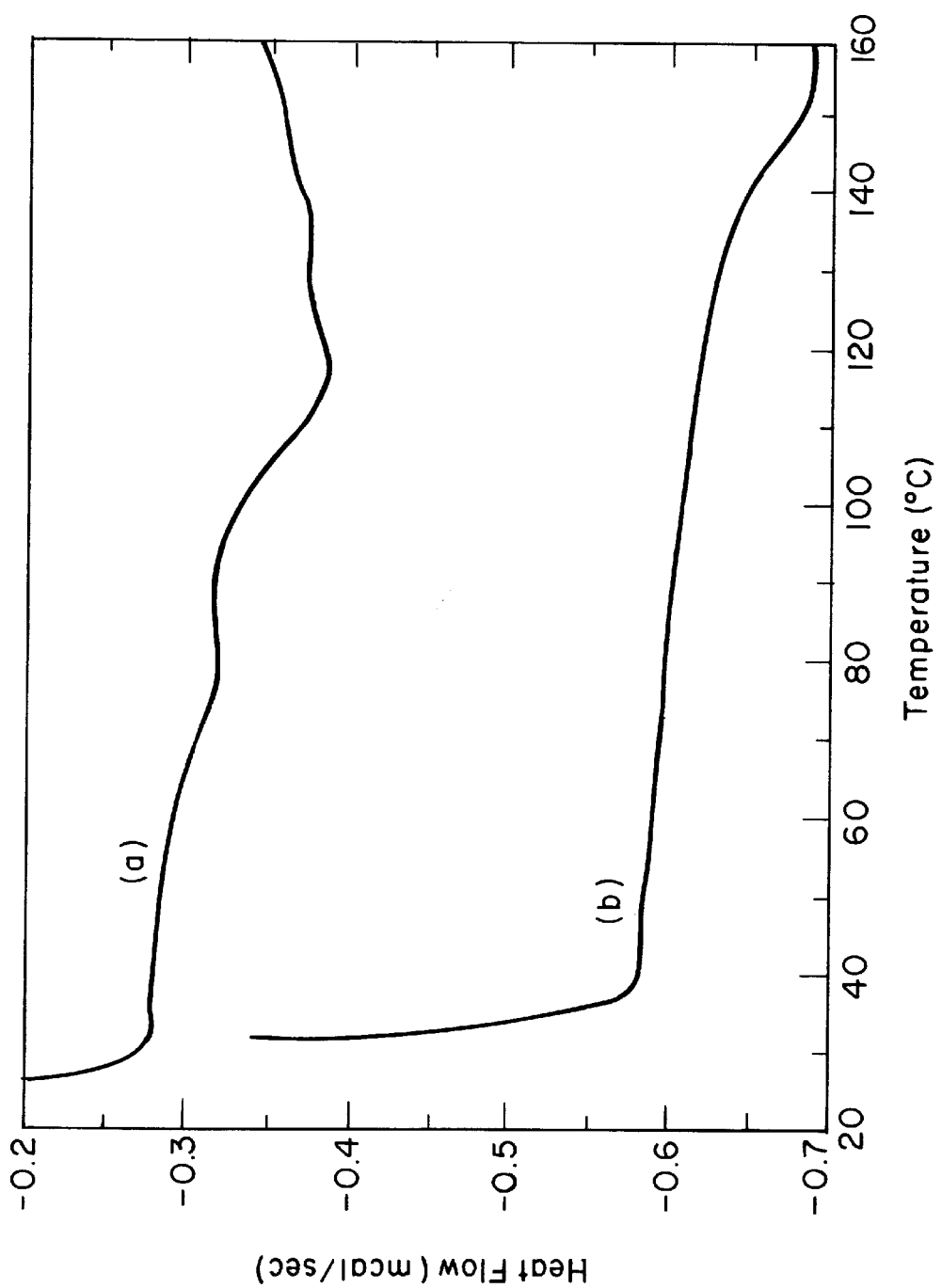
FIG. 5 is a differential calorimetric scan of two crosslinked polymers formed by the method of the invention.

A DSC scan at 10° K./min. of BPAZO is shown as curve (a) of FIG. 5. The exothermic reaction (curing) started at approximately 140° C. The DSC isotrack technique permitted good control of constant temperature of the sample, and was used to optimize the curing conditions. High curing temperatures were necessary for high $T_g$ systems because of low reaction rates after vitrification. However, curing and thermal degradation often compete at such high temperatures. These two factors were taken into consideration in our search for the optimum curing conditions. When the sample of BPAZO was heated at 160° C. for 2 hours, its $T_g$ advanced from 108° C. to 146° C. (curve b of FIG. 5). On heating for another 2 hours at 160° C., the $T_g$ of BPAZO remained unchanged. Similarly after the sample of BPAZO was heated at 170° C. for 2 hours, its $T_g$ advanced from 108° C. to 148° C. On the other hand, upon heating the pristine polymer for 3 hours at 150° C., its $T_g$ advanced from 108° C. to only 136° C. Based on the information above, the optimum curing condition chosen for BPAZO and BPAZO/APAN was isothermal heating of the sample at 160° C. for 2 hours (unless otherwise stated, this curing conditions was used throughout the study).

Figure 6:
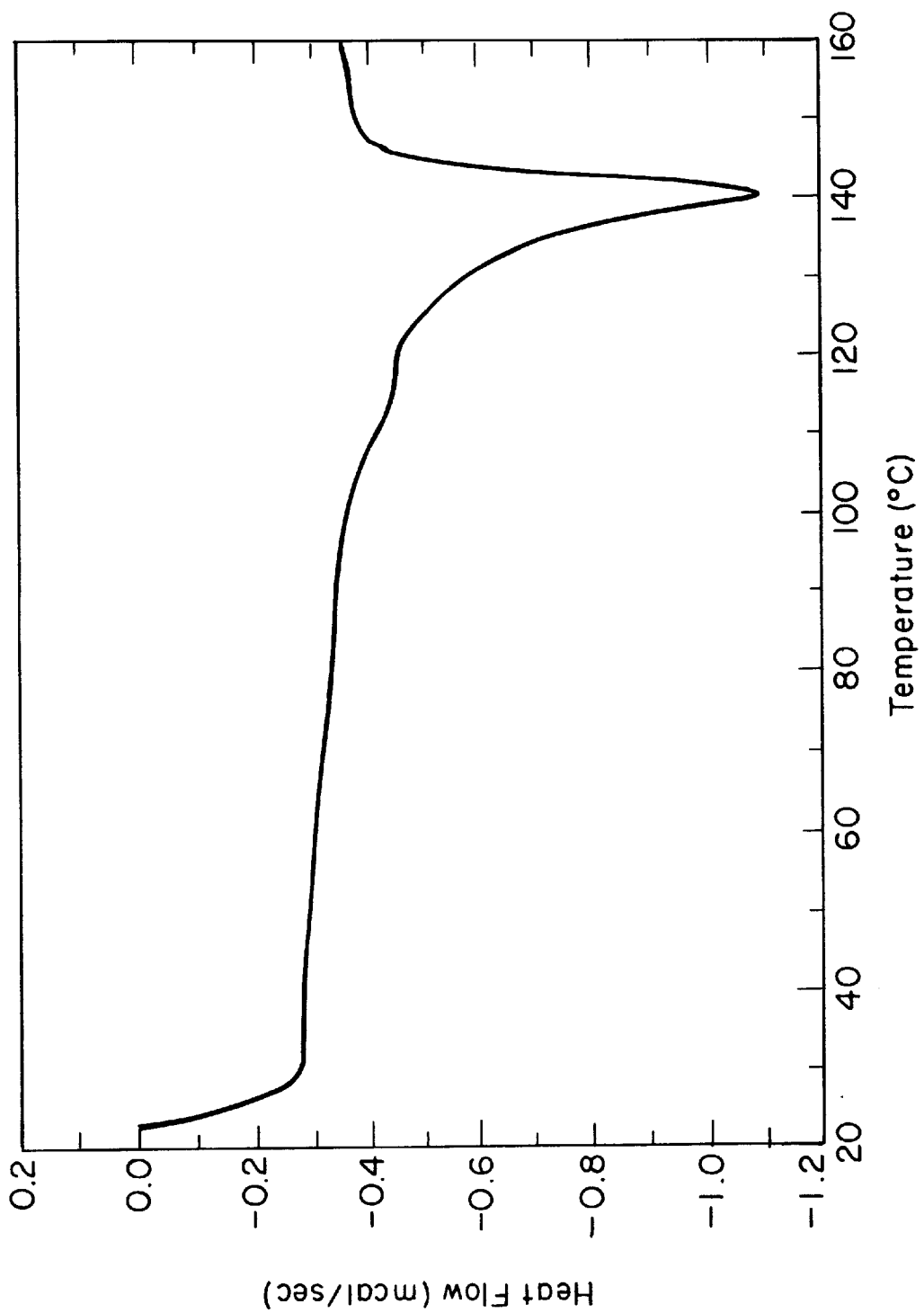
FIG. 6 is a differential calorimetric scan of a solution of a host crosslinkable polymer and a guest crosslinking agent before curing.
Figure 7:
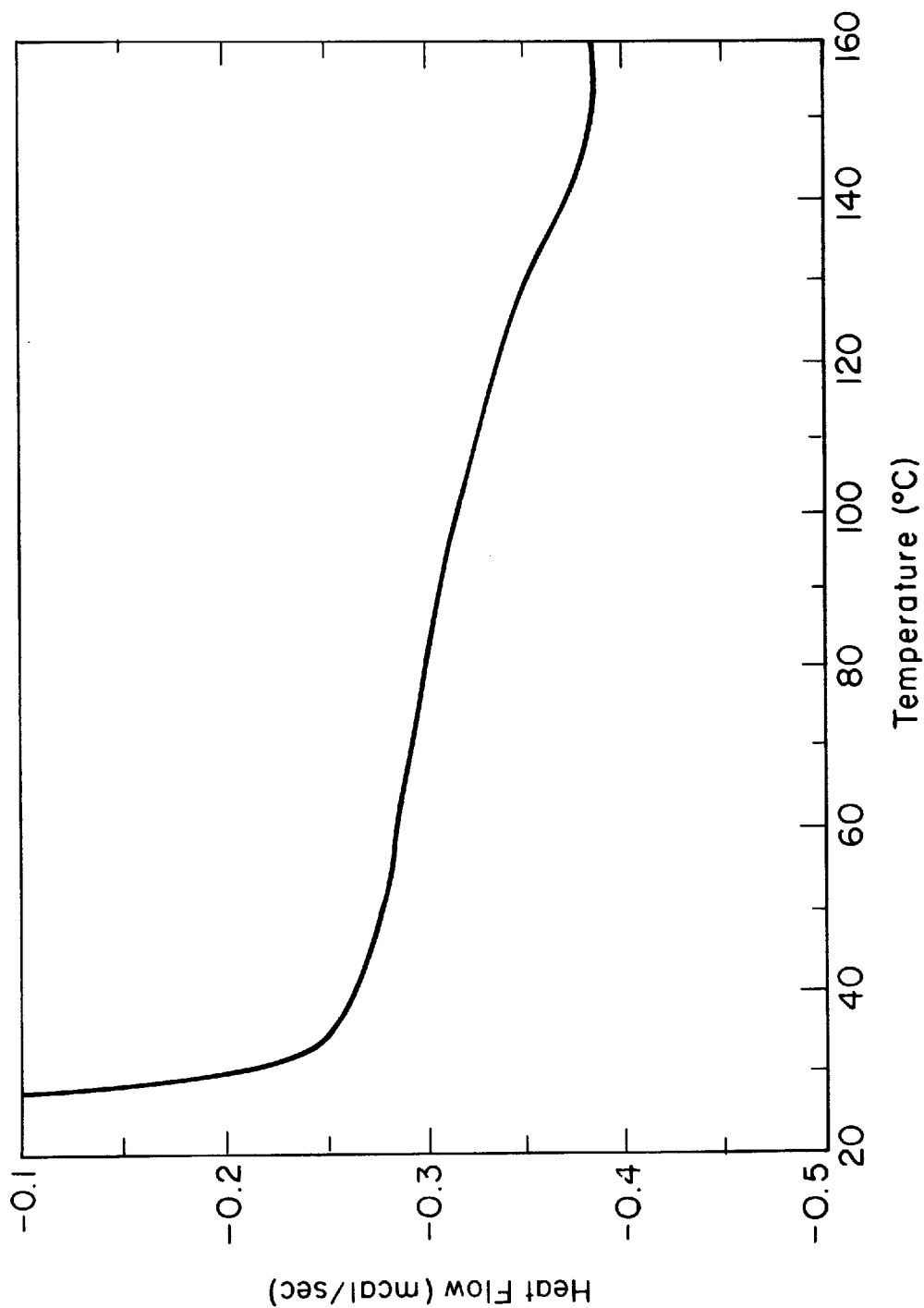
FIG. 7 is a differential calorimetric scan of the crosslinkable polymer and the guest crosslinking agent of FIG. 6 after curing.

DSC scans at 10/min of a mixed sample, BPAZO/APAN (weight ratio 2:1) before and after curing, are shown in FIG. 6 and FIG. 7, respectively. The curve for the pristine sample shows that the melting point of APAN was 140° C. On curing, the melting peak disappeared and a $T_g$ appeared at about 132° C. This suggested that the crosslinkable NLO dyes reacted during curing.

The $\Delta Cp$ ($T_g$) are 0.353 $Jg^{-1}K^{-1}$ and 0.200 $Jg^{-1}K^{-1}$ for the cured BPAZO and BPAZO/APAN, respectively. In comparison to the cured BPAZO, the decrease in $\Delta Cp$ ($T_g$) of the cured BPAZO/APAN indicated a net decrease in both chain mobility and vibrational contributions to $C_p$. This was considered to be a consequence of the formation of additional crosslinks.

D. IR Study of the Chemical Reactions

Figure 8:
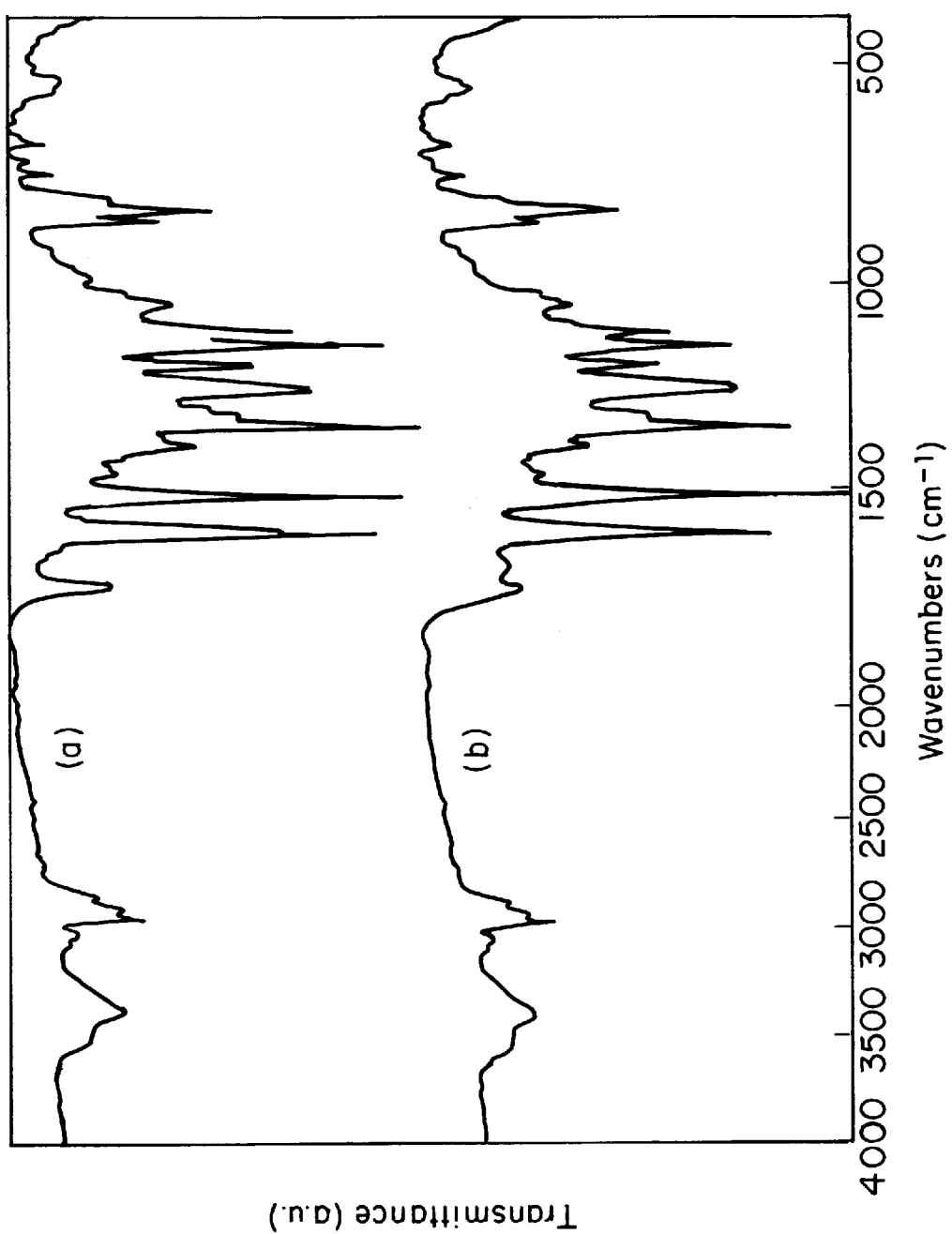
FIG. 8 shows infrared spectroscopic plots of a crosslinkable polymer of the present invention before and after curing.

Upon heating, the BPAZO underwent a reaction which could be analyzed by IR spectroscopy. Curves (a) and (b) of FIG. 8 are infrared spectroscopic plots of a crosslinkable polymer of the invention, before and after curing, respectively. As shown in FIG. 8, after 2 hours of heating at 160° C., the carbonyl absorption peak at 1722 $cm^{-1}$ shifted to 1730 $cm^{-1}$ and became slightly broader. This indicated that a certain extent of crosslinking occurred. In addition, an absorption peak emerged at 1680 $cm^{-1}$ after curing. This suggested that intermolecular hydrogen bonding existed in the cured sample. The hydrogen bonding weakened the C=O bond, resulting in absorption at lower frequency. The absorption peaks of the major functional groups, such as nitro (1338 $cm^{-1}$), phenyl (1601 $cm^{-1}$), and ether (1242 $cm^{-1}$), decreased only slightly in intensity after curing (the methyl absorption peak (2964 $cm^{-1}$) as the reference). It was, therefore, concluded that little thermal degradation occurred during curing.

Figure 9:
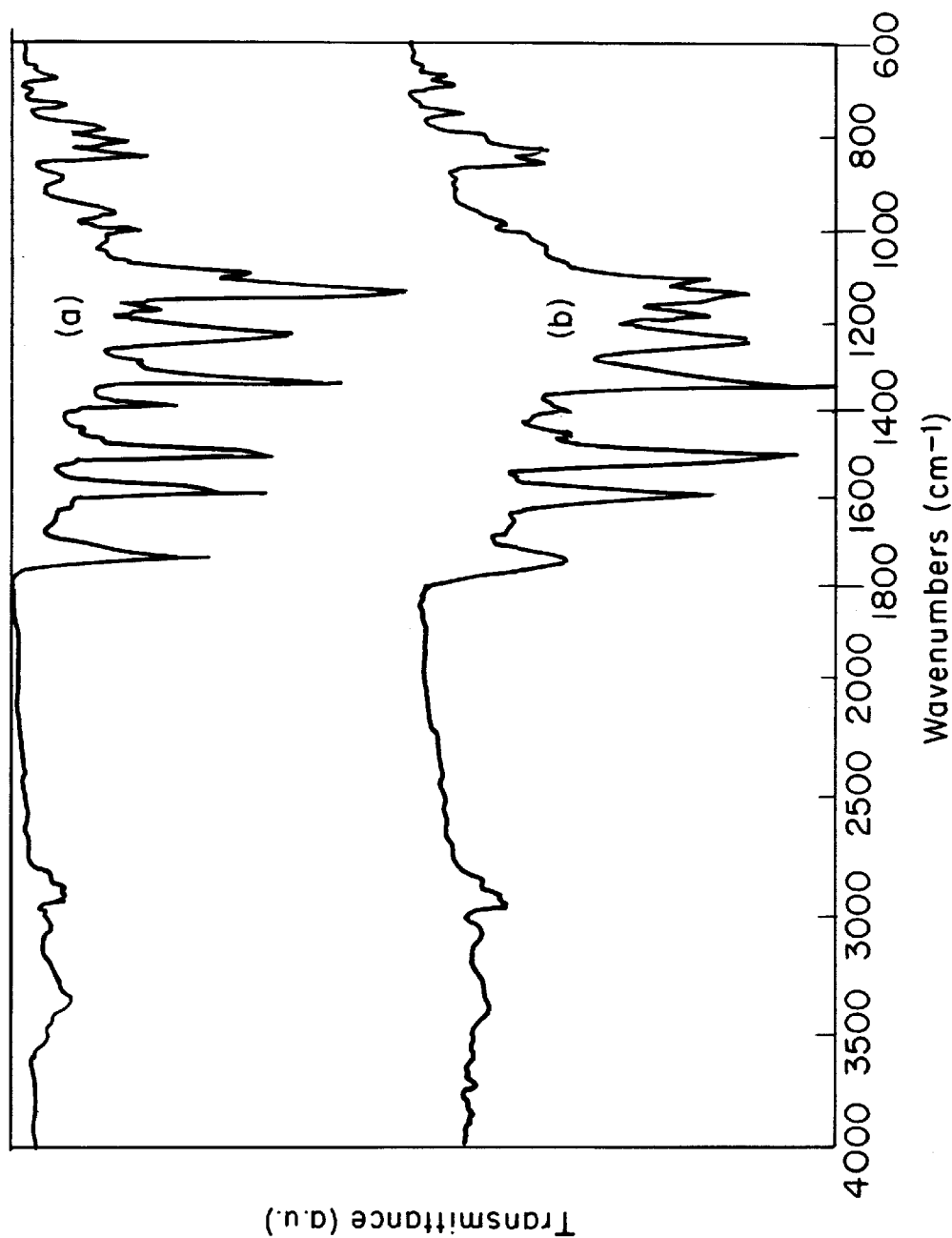
FIG. 9 shows infrared spectroscopic plots of a solution of a crosslinkable polymer and a crosslinking agent, before and after curing according to the method of the invention.

Curves (a) and (b) of FIG. 9 are spectroscopic plots of a crosslinkable polymer combined with a crosslinking agent, before and after curing, respectively, according to the method of the invention. For the BPAZO/APAN, as shown in FIG. 9, after 2 hours of isothermal heating at 160° C., the carbonyl absorption peak at 1730 $cm^{-1}$ not only shifted to 1747 $cm^{-1}$ but also became much broader. This suggested that a significant portion of the conjugated carbonyl groups were non-conjugated. It was also observed that the absorption peaks of the major functional groups of the cured sample, such as nitro (1340 $cm^{-1}$), phenyl (1599 $cm^{-1}$), and ether (1238 $cm^{-1}$), all decreased to some extent in intensity (the methyl absorption peak (2964 $cm^{-1}$) as the reference). This suggested that a certain amount of functionalized NLO dye either sublimed away or degraded during the curing process at 160° C.

E. Linear and Nonlinear Optical Properties

The second order NLO properties of BPAZO and BPAZO/APAN were characterized by second harmonic generation. The $d_{33}$ values obtained for the 1064 nm fundamental wavelength are listed in Table II, shown below, along with some linear optical properties.

TABLE II

Optical Properties of Cured BPAZO and BPAZO/APAN

| Polymer | BPAZO | BPAZO/APAN |
| --- | --- | --- |
| Thickness ($\mu$m) | 0.6 | 0.6 |
| Refractive indices, $\lambda$ ($\mu$m): | | |
| 0.532 | 1.762 | 1.712 |
| 1.000 | 1.664 | 1.592 |
| $d_{33}$ (pm/V) at 1.06 $\mu$m | 8.86 | 14.14 |
| $d_{31}$ (pm/V) at 1.06 $\mu$m | 2.42 | 3.98 |

The poled and cured films had $d_{33}$ values of 8.86 and 14.14 pm/V for BPAZO and BPAZO/APAN, respectively. The poled and crosslinked guest-host system, BPAZO/APAN had a higher $d_{33}$ value because it had a higher NLO chromophore density than BPAZO.

Figure 10:
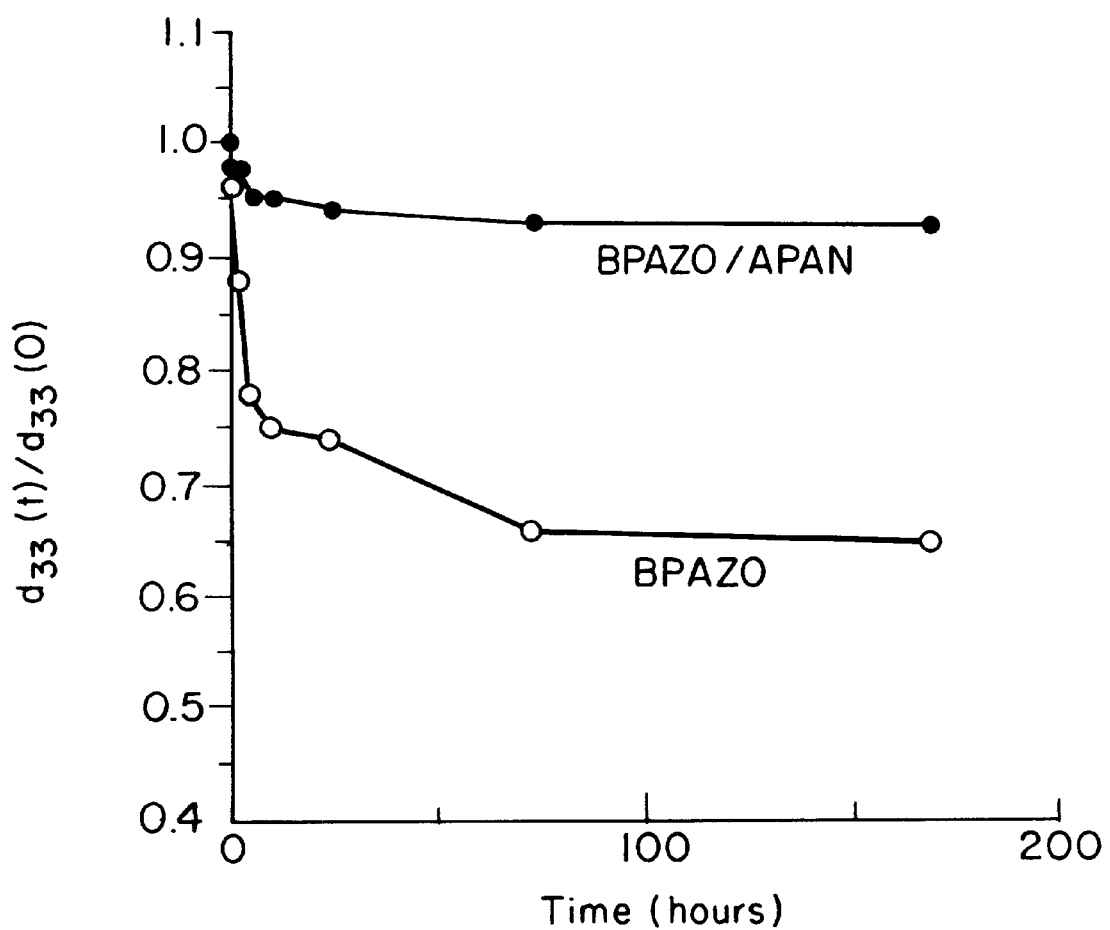
FIG. 10 shows plots of the second order nonlinear optical coefficient over time of two crosslinked polymers formed by the method of the invention.

The temporal stability at 100° C. of second order nonlinearity after poling and crosslinking of BPAZO and BPAZO/APAN was investigated (FIG. 10). The result clearly indicated that the poled and cured guest-host system, BPAZO/APAN, showed much better stability. Over 168 hours at 100° C., a reduction of 7% in $d_{33}$ was observed for the poled and cured BPAZO/APAN. Most of this loss was in the first few hours of heating. On the other hand, a reduction of 35% in $d_{33}$ was observed for the poled/cured BPAZO under the same thermal treatment. As mentioned earlier, the $T_g$ of BPAZO/APAN was 13° C. lower than BPAZO. However, the crosslinking density of BPAZO/APAN was much higher than BPAZO because many more reactive sites (acryloyl groups) were available in the crosslinked guest-host system. This was confirmed by the comparison of $\Delta Cp$ ($T_g$) in the previous thermal analysis section. More crosslinks between the polymer chains restricted the molecular motion of the segments and hence prevented randomization of the ordered NLO molecules. In addition, the nonlinear optical coefficients ($d_{33}$) of the poled/cured BPAZO and BPAZO/APAN remained unchanged under ambient condition for at least 168 hours, time to which these measurements were carried out.

F. UV-Vis Absorption Characteristics of Poled Films

Figure 11:
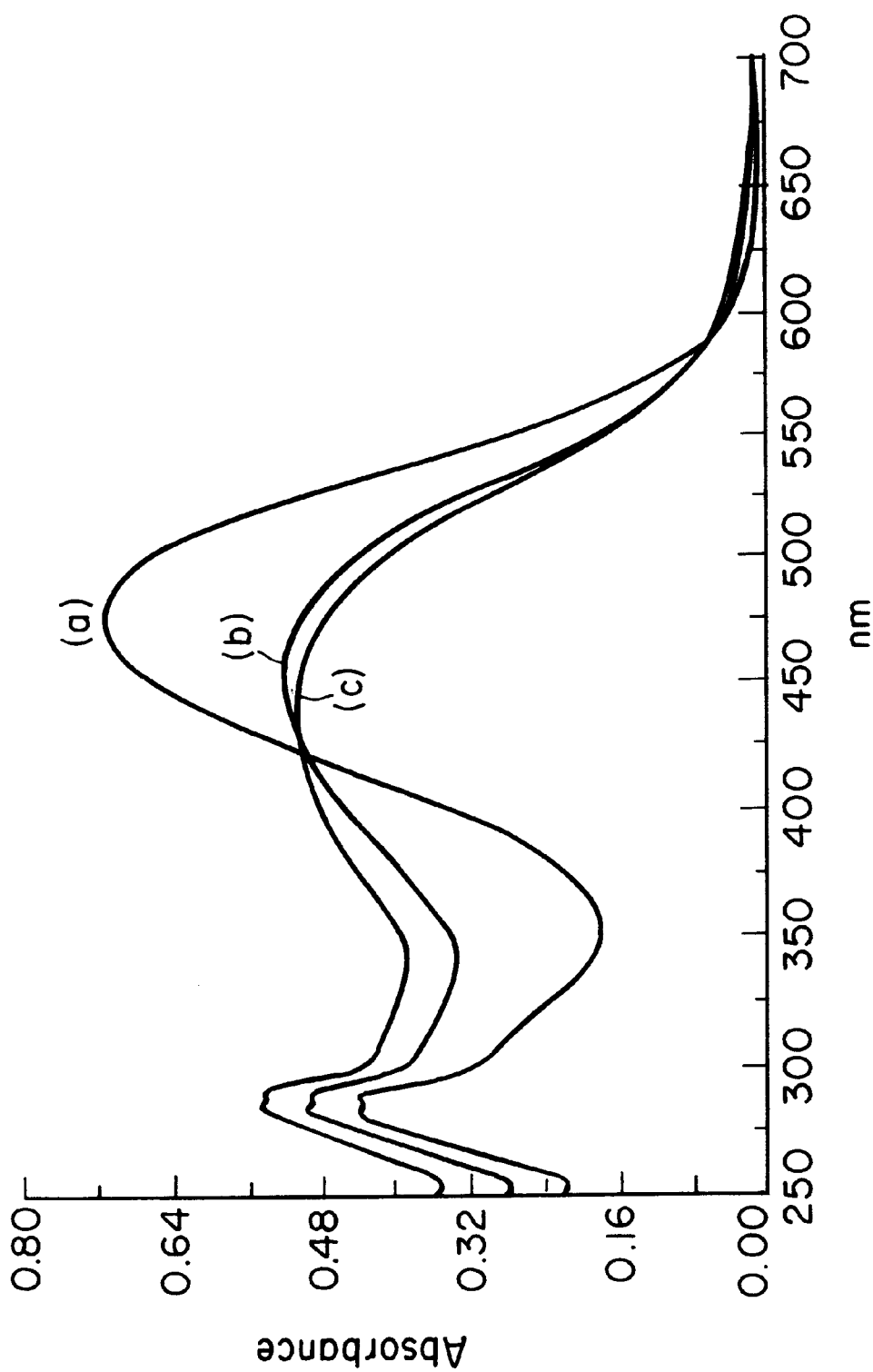
FIG. 11 shows plots of ultraviolet spectra of a crosslinkable polymer of the invention, before and after curing according to the method of the invention.

To investigate the absorption behavior as a function of time, the absorption spectrum was taken regularly over a 168 hour period under thermal treatment at 100° C. for poled/ cured BPAZO. An absorption peak at $\lambda_{max}$=463 nm existed before poling/curing. After poling/curing $\lambda_{max}$ shifted to 447 nm with a decrease of absorbance. During the next 168 hours, $\lambda_{max}$ shifted further toward shorter wavelengths with a slight decrease in absorbance (FIG. 11). In addition, an isobestic point is shown at 430 nm in FIG. 11. This implied that the polymer and perhaps the chromophore possibly underwent a certain extent of conformation change during the thermal treatment at 100° C.

Figure 12:
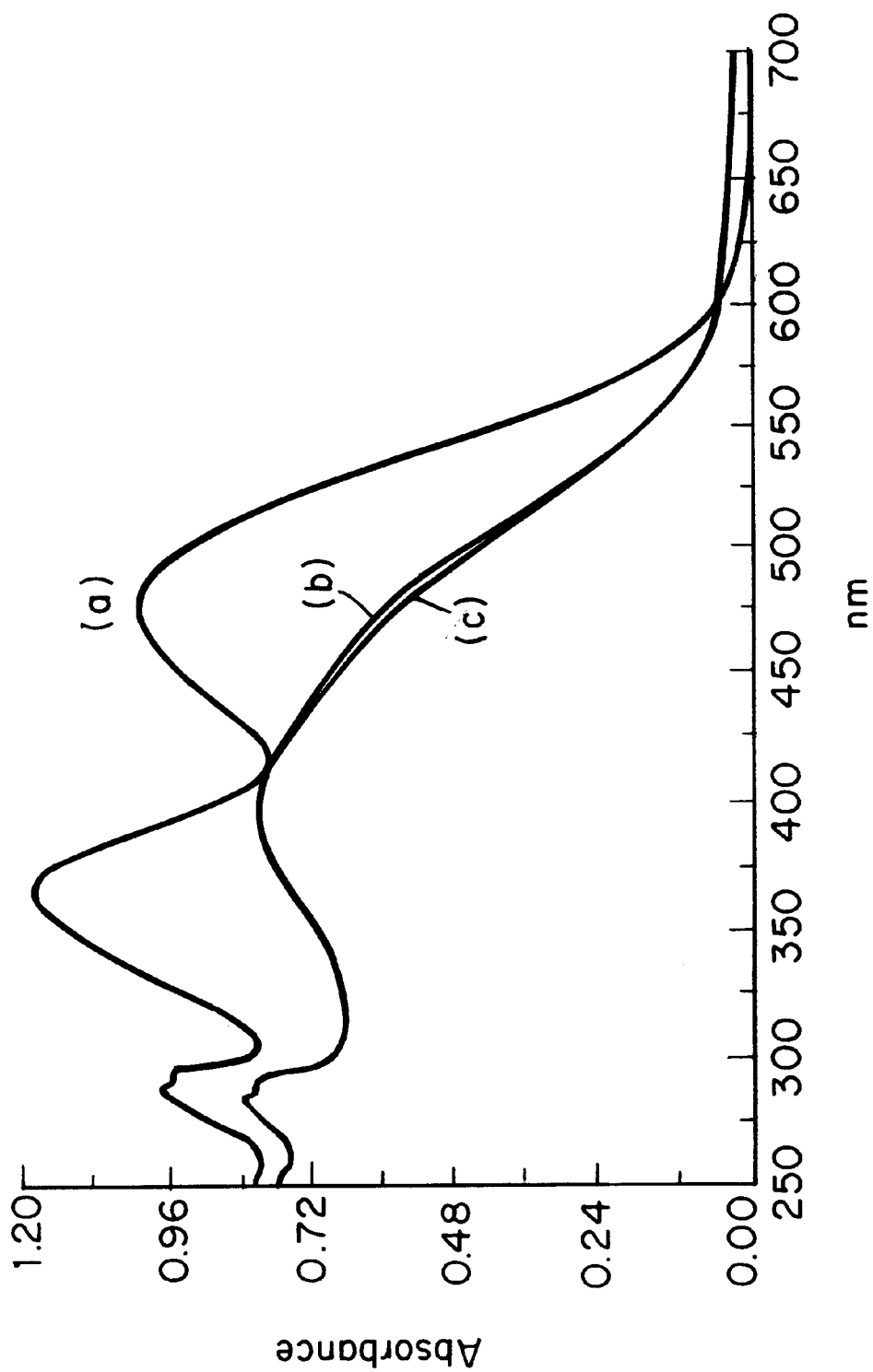
FIG. 12 shows plots of ultraviolet spectra of a crosslinkable polymer and a crosslinking agent, before and after curing according to the method of the invention.

For BPAZO/APAN, there were two absorption peaks, $\lambda_{max}$=352 nm, and $\lambda_{max}$=464 nm, corresponding to APAN and disperse orange 3 dye compound respectively in the spectrum of the pristine sample (FIG. 12). The absorption spectrum was also taken regularly over a 168 hour period under thermal treatment at 100° C. Immediately after poling/curing, a decrease in absorbance was observed. In addition, the two compound responded to the poling/curing process differently. Similar to the BPAZO case, the absorption peak of the disperse orange 3 chromophore shifted toward shorter wavelengths (the shoulder around 450 nm in spectrum (b)) after poling/curing. On the other hand, the absorption peak of the APAN dye chromophore shifted toward longer wavelengths, $\lambda_{max}$=388 nm, immediately after poling/curing. During the next 168 hours, the absorption spectrum remained almost unchanged. This result suggested that the dye/polymer system did not degrade or sublime throughout the whole period of thermal treatment.

Equivalents

Those skilled in the art will recognize, or be able to ascertain using no more than routine experimentation, many equivalents to the specific embodiments of the invention described herein. Such are intended to be encompassed by the following claims.

What is claimed is:

1. A method for forming a crosslinked polymer which exhibits second order nonlinear optical properties, comprising the steps of:

a) combining a host polymer, which includes a second order nonlinear optical component covalently bonded to the host polymer, with a guest crosslinking agent that will exhibit second order nonlinear optical properties upon exposure to an electric field;

b) exposing the combined host polymer and guest crosslinking agent to an electric field to pole the second order nonlinear optical component of the host polymer, whereby the host polymer exhibits second order nonlinear optical properties; and c) exposing the host polymer and the guest crosslinking agent to electromagnetic radiation to cause the guest crosslinking agent to crosslink the host polymer, thereby forming a crosslinked polymer which exhibits second order nonlinear optical properties.

2. The method of claim 1 wherein the combined polymer and crosslinking agent are exposed to an electric field to pole the crosslinking agent and thereby cause the crosslinking agent to exhibit second order nonlinear optical properties, before crosslinking the polymer.

3. The method of claim 2, further including the step of forming the host polymer by reacting a plurality of monomers, at least one of which contains a second order nonlinear optical component.

4. The method of claim 3 wherein at least one monomer which forms the host polymer is a bifunctional epoxy compound.

5. The method of claim 4 wherein the nonlinear optical component is an amino-functional compound.

6. The method of claim 5 wherein the bifunctional epoxy compound includes a diglycidylether of bisphenol A.

7. The method of claim 6 wherein the amino-functional compound includes 4(4'-nitrophenylazo)phenylamine.

8. The method of claim 2, wherein the crosslinking agent is photoreactive, whereby the polymer is crosslinked by exposing the combined polymer and crosslinking agent to light.

9. The method of claim 2, wherein the crosslinking agent is thermally reactive, whereby the polymer is crosslinked by exposing the combined polymer and crosslinking agent to heat.

10. The method of claim 9 further including the step of functionalizing the polymer with an acryloyl group.

11. The method of claim 10 wherein the crosslinking agent includes a difunctionalized nitroazobenzene.

12. The method of claim 11 wherein the crosslinking agent includes 2,4 acryloyloxy(4'-phenylazonitrobenzene).

* * * * *